United States Patent [19]

Greenway et al.

[11] Patent Number: 4,479,466

[45] Date of Patent: Oct. 30, 1984

[54] NATURAL GAS AND AIR MIXING DEVICE

[76] Inventors: Donald O. Greenway; Frank J. Davis, both of 6275 Georgia Hwy. 85, Riverdale, Ga. 30274

[21] Appl. No.: 554,362

[22] Filed: Nov. 22, 1983

[51] Int. Cl.³ .............................................. F02M 21/04
[52] U.S. Cl. .................................... 123/527; 123/525; 48/180 R; 261/41 R
[58] Field of Search .......... 123/525, 526, 527, 27 GE; 48/180.1, 189.2; 261/41, 69 R

[56] References Cited

U.S. PATENT DOCUMENTS

| | | | |
|---|---|---|---|
| 2,939,775 | 6/1960 | Middleton et al. | 48/180.1 |
| 3,081,160 | 3/1963 | Ensign | 48/180.1 |
| 4,020,810 | 5/1977 | Baverstock | 48/180.1 |
| 4,206,157 | 6/1980 | Plasmati | 261/59 |
| 4,285,888 | 8/1981 | Sahnas | 261/69 R |
| 4,298,550 | 11/1981 | Hayashi | 261/69 R |
| 4,308,839 | 1/1982 | Hafner et al. | 123/496 |
| 4,347,824 | 9/1982 | Pierson | 123/527 |
| 4,351,300 | 9/1982 | Selvidge et al. | 123/527 |
| 4,353,848 | 10/1982 | Carsten | 261/69 R |
| 4,364,364 | 12/1983 | Subramaniam | 123/527 |

FOREIGN PATENT DOCUMENTS

| | | | |
|---|---|---|---|
| 8202926 | 9/1982 | European Pat. Off. | 123/527 |
| WO81/01033 | 4/1981 | PCT Int'l Appl. | 123/525 |

*Primary Examiner*—Ethel R. Cross
*Attorney, Agent, or Firm*—Jones & Askew

[57] ABSTRACT

A natural gas and air mixing device for allowing the combustion of a mixture of natural gas and air in a conventional internal combustion engine. The device includes a gas plenum which disperses natural gas through apertures into a mixing chamber, where the gas mixes with air drawn through passageways in an annular rim which is fitted over the air intake of a conventional carburetor. The construction of the device allows alternate operation of the engine with gasoline as the fuel and requires few alterations in the engine compartment.

35 Claims, 3 Drawing Figures

NATURAL GAS AND AIR MIXING DEVICE

BACKGROUND

1. Field of the Invention

The present invention relates generally to the combustion of natural gas in internal combustion engines, and more particularly relates to a device for mixing natural gas and air to form a mixture which is combustible in a conventional internal combustion engine.

2. Description of the Prior Art

Because of escalating prices for petroleum-based fuels such as gasoline for use in transportation, alternate energy sources have been widely sought both for use in transportation and for industrial and domestic use. Of course, in seeking alternate energy sources the natural tendency is first to examine the feasibility of using locally available energy resources. Certain geographical locations find themselves blessed with certain types of energy resources, while deficient in others. For example, the Middle Eastern countries possess what seems to be a surfeit of petroleum, and hence have not felt the strains to develop alternate energy sources. Certain areas such a Canada, Alaska, and the Gulf States possess petroleum resources in varying degrees, and seem to possess abundant quantities of natural gas on a widespread basis. Still other areas have plentiful resources of natural gas and petroleum but are not conveniently located to petroleum refineries for converting crude petroleum to fuel. Because of the difficulty and expense of transporting and converting crude petroleum into fuels such as gasoline, diesel fuel, fuel oil, and the like, there has been great interest recently in utilization of natural gas as a fuel for transportation.

Because of the relative abundance of natural gas in certain locales as compared to petroleum products or the proximity of refineries, there is accordingly an incentive to employ this relatively abundant resource because of the economies involved. Use of natural gas instead of petroleum for transportation in many locations would result in cost savings both in the procurement of the fuel as well as in the transportation, refining, storage, and usage.

The use of compressed natural gas as an automotive fuel has sometimes presented difficulties due to the incompatibility of natural gas with conventional internal combustion engines. The air to fuel mixture ratio has been found to be extremely critical, for example. It has also been observed that the ignition timing for gasoline as a fuel does not work for natural gas due to the different combustion characteristics of natural gas. However, it is known in the art to provide for combustion of natural gas in internal combustion engines in certain limited applications. One known device allows the mixture of natural gas and air for vehicle engines which do not exceed about 300 cubic inches in displacement.

It has been found that engines of greater displacement than about 300 cubic inches frequently do not reliably operate with some types of prior art natural gas and air mixing devices, most likely because many of these devices are constructed for placement in the path of air flow to the engine. Accordingly, these devices sometimes do not permit a sufficient volume of air and natural gas mixture to enter the engine for reliable combustion. Such an approach to burning natural gas is typically a complete conversion to natural gas as a fuel source, and nessarily precludes the burning of gasoline as an alternate fuel with the ability to switch back and forth between natural gas and gasoline as the fuel source.

Other difficulties have been encountered in adapting conventional internal combustion engines to burn natural gas. Emission control devices currently required under government air pollution laws alter the combustion characteristics of the gasoline/air mixture such that the levels of emissions produced during the combustion of gasoline are acceptable as measured by federal standards. The presence of this emission control equipment has been found to alter the combustion characteristics of natural gas and air provided in many conventional natural gas conversion devices, such that the emission control equipment must be removed in order for the engine to operate at all. Removal of pollution control equipment, of course, effects a complete conversion to natural gas and prevents legally switching back to gasoline.

Additionally, many prior art natural gas and air mixing devices actually require physical modification of the vehicle air cleaner and removal of the air filter in order to incorporate the mixing device, which may be larger than the size of the open area inside the conventional vehicle air filter. These modifications also effect a total conversion to natural gas and preclude the convenient switching between natural gas and gasoline, because the air filter must be replaced and the emission control equipment must be either re-installed or made re-operable in order to convert back to gasoline. All of the foregoing considerations lend to increased cost and complexity in order to burn natural gas.

Other prior art devices for allowing the introduction of natural gas for combustion into an vehicle engine require modifications to the carburetor. For example, one known prior art device provides the natural gas supply line directly into a port or opening made in the side of the carburetor. Frequently, adaptation of the carburetor to accept this type of prior art device requires removal of the carburetor from the engine and installation of appropriate fittings in order to receive the natural gas line. Again, such modifications lend to complexity and cost in conversion of a vehicle to burn the alternate fuel.

Still other prior art types of devices for conversion to natural gas require installation of natural gas injecting equipment in the "horn" or cylindrical air filter extension of the engine air cleaner assembly. Air flow in this type of device is so restricted that the carburetor cannot be used in the manner in which it was originally intended. Thus, these devices also preclude convenient switching back to gasoline as a fuel.

Accordingly, there has long been a need for an efficient and effective device which mixes natural gas and air for combustion in a conventional internal combustion engine without requiring complex and costly alterations to the engine.

There has also been a need for a device which not only allows the efficient combustion of natural gas in the engine, but also allows the rapid and convenient switching between natural gas and gasoline as fuel sources so that advantage may be taken of whatever fuel source is available.

SUMMARY OF THE INVENTION

The present invention seeks to overcome these and other problems in prior art natural gas and air mixing devices by providing apparatus which allows the introduction of a combustible mixture of natural gas and air into a conventional unmodified vehicle carburetor, and which also allows alternative operation of the vehicle with gasoline as a fuel. Briefly described, the preferred embodiment of the present invention comprises an annular rim which is positioned over substantially the entire air intake of a conventional vehicle carburetor. The rim includes a plurality of air passageways having rounded corners and which allow and which allow air through the vehicle air cleaner to enter the interior volume of the rim. Above the rim is disposed an upper plate which includes a plurality of gas-dispersing apertures. A hollow gas plenum is positioned on the plate above the gas-dispersing apertures and receives a supply of natural gas through a supply line provided through the top of the engine air cleaner. Natural gas introduced into the plenum is dispersed downwardly through the gas-dispersing apertures into a mixing chamber comprising the interior volume defined by the rim, where it mixes with air entering through the air passageways to form a combustible mixture which is burned by the engine.

More particularly described, the gas-dispersing apertures of the plate comprise a plurality of passageways disposed in an annular or ring-like configuration at equal predetermined radii fromm a common center located on the plate member. The plenum is also annular and has its axis aligned with the common center about which the gas-dispersing apertures are disposed. The plenum has a radius slightly larger than the radius at which the gas dispersing apertures are disposed, such that the apertures allow free communication of the gas in the plenum into the space or mixing chamber defined by the annular rim.

The air passageways in the rim are sized to allow sufficient air to enter the carburetor for conventional operation of the engine when operation with gasoline as a fuel is desired. When natural gas is selected as a fuel, the air filtered by the air cleaner passes through the air passageways into the interior volume or mixing chamber of the device, where it creates a swirling action which promotes the mixing of the natural gas and the air to form a highly combustible mixture.

Still more particularly described, the preferred embodiment of the device of the present invention comprises a lower base member which includes the upper plate with the gas-dispersing apertures, and an integral rim which includes the air passageways. An upper cover member which matingly interfits with the lower base member has defined therein the gas plenum and a port which allows introduction of natural gas into the plenum when the upper cover member is affixed to the lower base member. An axial hole in the center of both the lower base member and the upper cover member receives the air cleaner cover fastener rod of the engine carburetor and aligns the device over the air intake of the carburetor. Such a two-part construction allows ease of manufacture and assembly, with no moving parts and few fabrication steps.

Accordingly, it is an object of the present invention to provide an improved natural gas and air mixing device for internal combustion engines.

It is another object of the present invention to provide a natural gas and air mixing device which allows the introduction of a combustible mixture of natural gas and air into a conventional internal combustion engine carburetor, while still allowing alternative operation of the engine with gasoline as a fuel.

It is another object of the present invention to provide an efficient and effective device which allows the combustion of natural gas in an internal combustion engine without carburetor modifications, removal of emission control devices, or alteration of the conventional air cleaner assembly other than providing the natural gas supply line to the device.

It is another object of the present invention to provide a natural gas and air mixing device which is simple, easy and inexpensive to fabricate, and which is operable in principle with any engine size.

It is another object of the present invention to provide a natural gas and air mixing device which allows the combustion of natural gas in an internal combustion engine which may be easily and quickly retrofitted into a vehicle.

It is another object of the present invention to provide a device which allows the combustion of natural gas in an internal combustion engine but which does not restrict the air flow so that the engine may be also operated with gasoline as a fuel.

These and other objects, features, and advantages of the present invention may be more clearly understood and appreciated from a review of the following detailed description of the disclosed embodiment and be reference to the appended drawings and claims.

DETAILED DESCRIPTION OF THE PREFERRED EMBODIMENT

Figure 1:
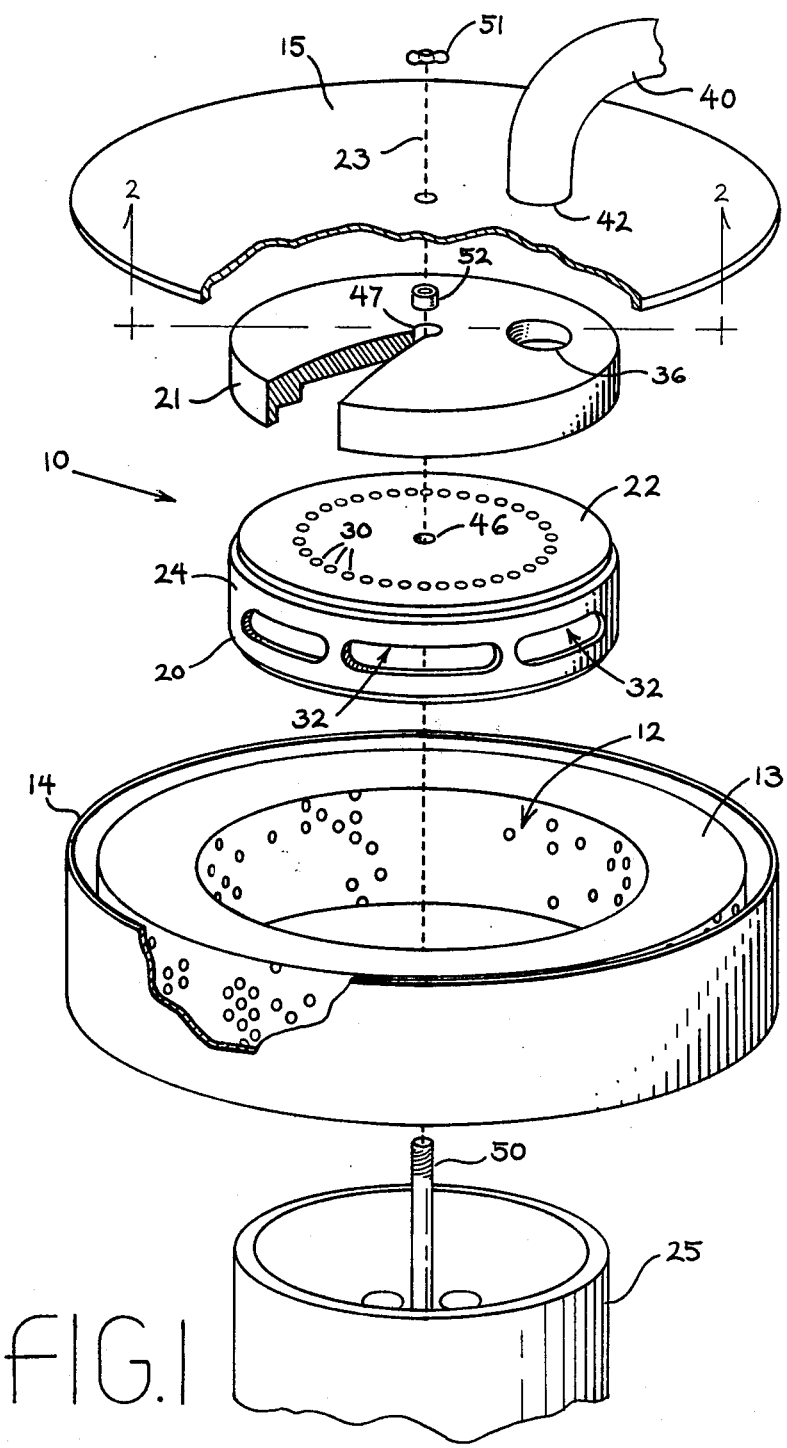
FIG. 1 is a perspective exploded view of a preferred embodiment of a natural gas and air mixing device constructed in accordance with the present invention.

Referring now to the drawings, in which like numerals indicate like elements throughout the views, FIG. 1 shows in exploded form a preferred embodiment of a natural gas and air mixing device 10 constructed in accordance with the present invention. The device 10 is constructed for placement and operation within the cylindrical inner volume 12 of a conventional vehicle air filter 13 located inside a conventional engine air cleaner assembly 14. Natural gas, which is a mixture of predominantly methane and other gaseous combustible hydrocarbon fuels, is the preferred fuel for use in the present invention. However, other gaseous combustible hydrocarbon fuels such as ethane, propane, methane, and the like, and mixtures thereof, are also suitable for use.

The preferred embodiment of the device 10 comprises only two basic components, a circular lower base member 20 and a circular upper cover member 21. The lower base member 20 comprises a substantially flat upper plate member 22, and a downwardly disposed annular rim 24 for positioning over substantially the entire air intake of a conventional vehicle carburetor 25. The rim 24 and upper plate member 22 form a cylindrical inner volume or mixing chamber 28 of the device.

As used herein, the term "carburetor" includes conventional carburetors as well as throttle body injection devices for introducing air into fuel injection engines. It will thus be understood that the present invention is operable with both conventional carburetor-type internal combustion engines as well as fuel injection ones.

The lower base member 20 includes a plurality of circular gas-dispersing apertures 30 arranged in an annular or ring-like configuration on the upper plate 22 and spaced inwardly from the outer circumference of the plate member. The disclosed embodiment of FIG. 1 is designed for engines having displacements of about 250 to about 500 cubic inches. For such an embodiment, each of the apertures 30 is preferably formed with an 11/64 drill to obtain a 0.1719 diameter opening in the preferred embodiment. The apertures are each disposed at eqaul predetermined radii from the axis or center 23 of the circular base member 20.

Figure 2:
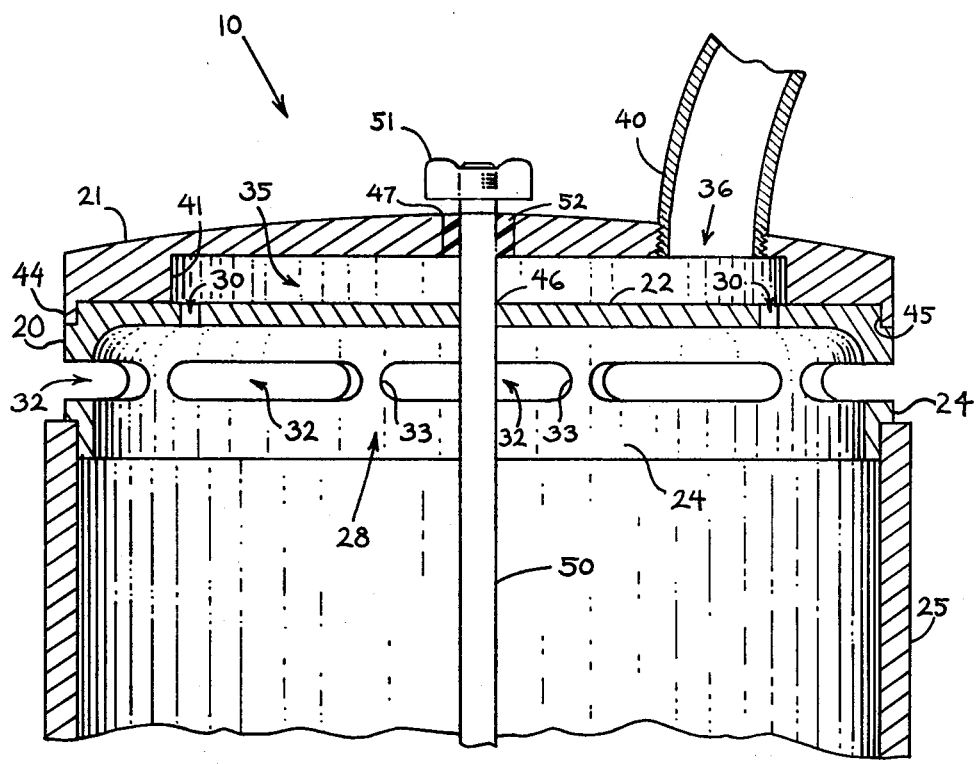
FIG. 2 is a sectional view taken along the line 2—2 of the assembled preferred embodiment shown in FIG. 1.

The annular rim 24 of the lower base member 20 includes a plurality of elongate air-introducing side passageways 32. Each of these air passageways 32 have a length and a width, with the width of the passageways in the preferred embodiment extending in substantially the same direction as the axis 23 defined by the center of the base member 20. Each of the air passageways further includes arcuate end portions 33 (FIG. 2). In the disclosed embodiment of FIG. 1, each of the air passageways 32 has a length not including the arcuate end portions of 1.040 inches, and a width of 0.2813 inches, such that the total area of the opening is about 0.2755 square inches. Also in the preferred embodiment, there are twelve air passageways 32 providing a total air surface opening area of about 3.306 square inches. It is believed that this area is sufficiently great to allow substantially unimpeded operation of the engine using gasoline as a fuel should the burning of natural gas not be desired. It is further believed that the configuration of elongate passageways oriented with the length extending in the direction of the circumference of the rim, with arcuate end portions, creates air flow characteristics on the interior of the device which swirls the natural gas and air to provide a more complete mixture prior to the introduction of the mixture into the carburetor.

The ratio of the area of the air passageways 32 to the area of the apertures 30 is about 13.469:1 in the preferred embodiment. Tests indicate that this configuration produces a natural gas-to-air mixture ratio of about 13.469:1. For operation with engines having displacements of greater than 500 cubic inches or less than 250 cubic inches, it is believed that the ratio of the area of the air passageways to the area of the apertures should be maintained at about 13.469:1, although of course the actual dimensions of the apertures and air passageways will be larger or smaller, as appropriate.

The upper cover member 21 includes a cylindrical volume which defines an annular plenum 35. A port 36 allows introduction of natural gas into the plenum 35 from a natural gas supply line 40, which is connected to a pressure-responsive valve or regulator which does not form a part of the present invention. Those skilled in the art will understand that natural gas may be provided in the gas supply line 40 from conventional pressure-responsive valves or regulators which are responsive to sense negative air pressure to release gas into the supply line. The vaccum provided by the internal combustion engine operation provides the negative air pressure which causes the introduction of natural gas into the plenum 35.

The plenum 35 in the preferred embodiment has a radius slightly larger than the radius at which the apertures 30 on the lower base member 20 are disposed. Accordingly, the apertures 30 are disposed relatively close to but spaced inwardly from the vertical wall 41 in the upper cover member 21 which defines the plenum 35.

The lower base member 20 and upper cover member 21 matingly interfit as illustrated in FIG. 2. A depending annular lip 44 is matingly received in an annular recess 45 of the base member 20. The lower base member 20 includes a circular opening 46 aligned with axis 23 for receiving the vertical threaded air cleaner mounting rod 50 of the vehicle carburetor 25. A mating coaxial circular opening 47 is provided in the upper cover member 21 for receiving the mounting rod 50, and allows the upper cover member and the lower base member to be fastened together and held in place with a conventional wing nut 51. A grommet 52 (FIG. 1) or the like may be placed into the circular opening 47 to seal off the plenum 35 and prevent gas from escaping.

Figure 3:
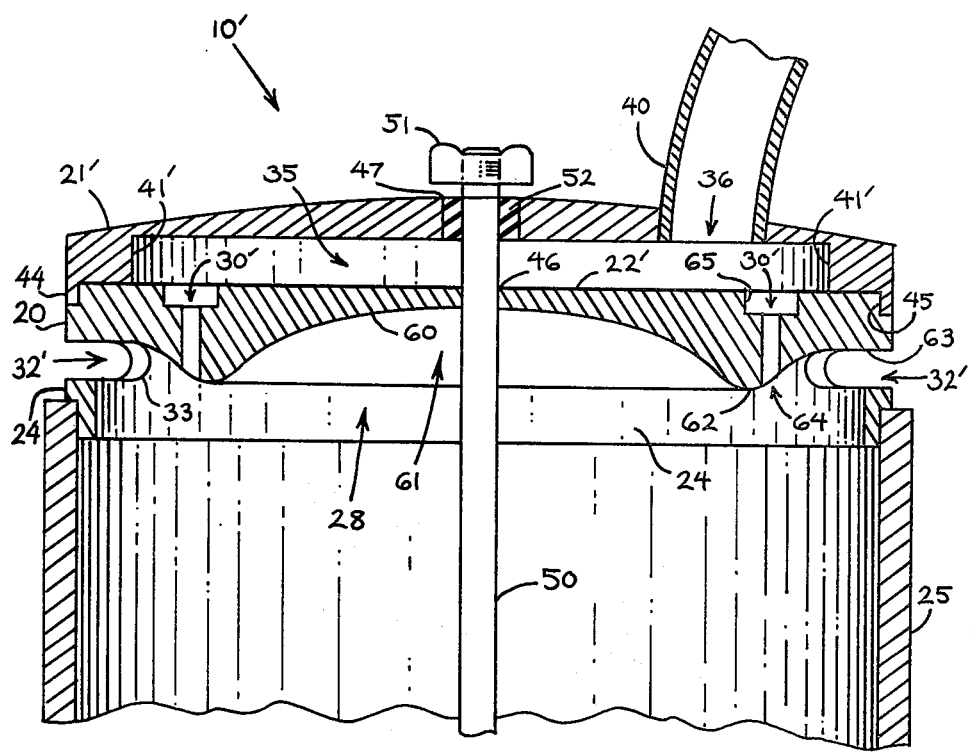
FIG. 3 is a sectional view taken along the line 2—2 of an assembled second preferred embodiment.

Turning now to FIG. 3, there is shown a second embodiment 10' having a configuration of apertures and air passageways which cooperate to direct air flow past the apertures to enhance the Venturi effect for drawing gas into the interior volume of the mixing device. In the second embodiment 10', the lower surface 60 of the upper plate member 22' defines a concave inverse dish or dome-shaped depression 61 coaxial with the upper cover member 21'. The lower surface 60 curves radially outwardly and downwardly from the axis toward a depending curved lip or rim 62 and then curves upwardly along surface 63 to the edges of the air passageways 32'.

Surface 63 thus defines a downwardly facing air flow surface spaced radially inwardly from the rim 24 for directing air entering the air passageways 32' inwardly and downwardly. This air flow surface is coextensive with the upper edges of the air passageways 32'. Moreover, the lowermost extend ot the air flow surface 63 (defined by the lip 62) is spaced apart from and radially inwardly of the lower edges of the air passageways.

It will thus be understood that if viewed from underneath, the upper plate member 22' has defined therein a concave dome or dish bounded by the lip 62 which tapers outwardly in a slightly concave fashion along the air flow surface 63. It will be further appreciated that air entering the air passageways 32' is directed along the surface 63 by the negative manifold pressure.

Each of the apertures 30' in FIG. 3 extend from the upper surface of the upper plate member 22' to form an elongate aperture which opens on the surface 63 and is substantially aligned with the lip 62, but which is positioned slightly radially outwardly from the lip. It will thus be understood that the opening 64 defined in the surface 63 is oval or elliptical.

An annular groove 65 is defined in the upper plate member 22' at approximately the same radius at which the apertures 30' are disposed, for providing a recess aligned with the apertures. It is believed that if heavier gases such as propane are injected into the plenum 35, that the presence of the groove 65 allows an accumulation of the heavier gas within the groove and that accordingly these heavier gases will be first drawn into the apertures.

Additionally, in the second embodiment 10', the plenum 35 has a radius slightly larger than that shown in FIG. 2, such that the wall 41' of the plenum is positioned at a radial distance greater than radius of groove 65.

In order to retrofit a conventional vehicle for operation with natural gas using the disclosed embodiment, the air cleaner cover 15 is provided with an opening 42 for receiving a natural gas supply line 40. The lower base member 20 is then placed into the cylindrical opening 12 of the air filter 13 by mounting on the air cleaner mounting rod 50, and the upper cover member 21 fitted onto the lower base member 20. The air cleaner cover 15 may then be placed over the air filter 13 and the entire assembly secured with the wing nut 51. The gas supply line 40 is then provided through the opening 42 and affixed to the upper cover member 21. Compressed natural gas may be carried in a container in the vehicle (such as in the trunk of an automobile) and a supply line run underneath the vehicle to the engine compartment and then to the opening 42.

In order to switch from natural gas to gasoline and back, a valve may be mounted on the gasoline feed line (not shown) and on the gas supply line 40, so that when operation with gasoline is desired, the natural gas supply line 40 is cut off and the gasoline feed line is turned on, and when alternate operation with natural gas is desired, the gasoline feed line is shut off and the natural gas supply line is turned on. It will be appreciated that these valves may be made remotely actuatable from within the passenger compartment with the use of solenoid valves or the like for control from a conventional electrical switch mounted for convenient operation by the driver.

Advantageously, no further modifications need to be made to the vehicle. It will therefore be appreciated that there is no need for removal of emission control equipment, no need to modify the carburetor, and no need to obstruct the flow of air entering the air cleaner assembly.

The preferred embodiment of the present invention has been disclosed by way of example and it will be understood that other modifications may occur to those skilled in the art without departing from the scope and the spirit of the appended claims.

We claim:

1. A natural gas and air mixing device for allowing the introduction of a combustible mixture of natural gas and air into a conventional internal combustion engine carburetor, comprising:
   rim means for positioning over substantially the entire air intake of a conventional internal combustion engine carburetor and defining an interior volume of mixing the gas and air,
   said rim means including a plurality of air passageways for introducing air from a conventional air cleaner into said interior volume;
   an upper plate member rigidly secured to said rim means and including a plurality of gas-dispersing apertures positioned over said interior volume; and
   hollow gas plenum means positioned on said plate member above said gas-dispersing apertures for receiving a supply of natural gas;
   whereby natural gas introduced into said plenum is dispersed downwardly into said interior volume through said gas-dispersing apertures and mixes with air entering said interior volume through said air passageways to form a combustible mixture.

2. The device of claim 1, wherein said gas-dispersing apertures comprise round passageways formed in said plate member.

3. The device o claim 1, wherein the total area of said apertures is about 0.7424 square inches.

4. The device of claim 1, wherein the total area of said air passageways is about 3.3060 square inches.

5. The device of claim 1, wherein the ratio of the area of said air passageways to the area of said apertures is about 13.469:1.

6. The device of claim 1, wherein the air and natural gas mixture ratio of the combustible mix introduced into the carburetor is about 13.469:1.

7. The device of claim 1, wherein each of said air passageways includes arcuate and portions.

8. The device of claim 1, wherein said rim means is annular.

9. The device of claim 1, wherein said gas-dispersing apertures are disposed at equal predetermined radii from a common center located on said plate member.

10. The device of claim 9, wherein said common center on said plate member is aligned with an axis of said plate member oriented perpendicularly to the plane of said plate member.

11. The device of claim 10, wherein said plenum is annular, and has an axis aligned with said axis of said plate member.

12. The device of claim 11, wherein the radius of said plenum is greater than said equal predetermined radii at which said gas-dispersing apertures are disposed.

13. The device of claim 1, wherein said upper plate member includes a downwardly facing air flow surface spaced radially inwardly from said rim means for directing air entering through said air passageways inwardly and downwardly.

14. The device of claim 13, wherein said air passageways include an upper edge and a lower edge, and wherein said downwardly facing air flow surface is coextensive with said upper edge of at least one of said air passageways.

15. The device of claim 13, wherein said gas-dispersing apertures are positioned to open on said downwardly facing air flow surface.

16. The device of claim 13, wherein said upper plate member further includes a downwardly facing concave lower surface, and an annular lip spaced radially inwardly from said rim means and forming an intersection between said downwardly facing air flow surface and said downwardly facing concave lower surface.

17. The device of claim 13, wherein the lowermost extent of said downwardly facing air flow surface is spaced apart from and radially inwardly of said lower edge of at least one of said air passageways.

18. The device of claim 1, further comprising means defining an air flow surface positioned radially inwardly of at least one of said air passageways for directing air entering said air passageways inwardly and downwardly.

19. The device of claim 18, wherein said air flow surface means comprises a downwardly depending annular second rim having a radius less than said rim means and rigidly secured to the lower surface of said upper plate member, and wherein said gas-dispersing apertures are positioned to open on said air flow surface means.

20. A natural gas and air mixing device for allowing the introduction of a combustible mixture of natural gas and air into a conventional internal combustion engine carburetor, comprising:
   a lower base member comprising an upper plate member and a downwardly disposed rim,
   said plate member including a plurality of gas-dispersing apertures disposed on said plate member.
   said plate member and said rim defining an interior volume for said base member for disposition over the air intake of a conventional internal combustion engine carburetor, said rim including a plurality of elongate side air passageways for introducing air from outside said rim into said interior volume of said base member; and an upper cover member comprising a gas plenum positioned over said gas-dispersing apertures, and port means for introducing natural gas into said plenum;

whereby natural gas introduced into said plenum is dispersed downwardly into the interior volume of the base member through the gas-dispersing apertures, where it mixes with air entering the interior volume through the side air passageways to form a mixture combustible in a conventional gasoline engine.

21. The device of claim 20, wherein said upper plate member is substantially flat.

22. The device of claim 20, wherein said gas-dispersing apertures comprise round passageways formed in said plate member.

23. The device of claim 20, wherein the total area of said apertures is about 0.7424 square inches.

24. The device of claim 20, wherein the total area of said air passageways is about 3.3060 square inches.

25. The device of claim 20, wherein the ratio of the area of said air passageways to the area of said apertures is about 13.469:1.

26. The device of claim 20, wherein the air and natural gas mixture ratio of the combustible mix introduced into the carburetor is about 13.469:1.

27. The device of claim 20, wherein each of said passageways includes arcuate end portions.

28. The device of claim 20, wherein said gas dispersing apertures are disposed at equal predetermined radii from a common center located on said plate member.

29. The device of claim 28, wherein said common center on said plate member is aligned with an axis of said plate member oriented perpendicularly to the plane of said plate member.

30. The device of claim 29, wherein said plenum is annular and has an axis aligned with said axis of said plate member.

31. The device of claim 20, wherein each of said passageways comprises an elongate passageway having a greater length than width, and wherein the width of each passageway is oriented substantially in the direction of the axis of said base member.

32. The device of claim 20, wherein said downwardly disposed rim of said base member is annular.

33. A natural gas and air mixing device for allowing the introduction of a combustible mixture of natural gas and air into a conventional internal combustion engine carburetor, comprising:

a circular lower base member comprising a substantially flat upper plate member and a downwardly disposed annular rim for positioning over substantially the entire air intake of a conventional internal combustion engine carburetor, said plate member including a plurality of circular gas-dispersing apertures disposed in a ring-like configuration and at equal predetermined radii from the axis of said base member, said rim including a plurality of elongate air-introducing side passageways having a length and a width, the width of said passageways extending in substantially the same direction as the axis of said base member, and each of said passageways including arcuate end portions; and an upper cover member comprising a downwardly disposed annular mating ring for mating said cover member with said plate member of said base member, an annular plenum having an axis aligned with the axis of said base member and having a radius larger than the radius at which said apertures in said plate member are disposed, and port means for introducing natural gas from a supply into said plenum;

whereby natural gas introduced into said plenum is dispersed downwardly into said base member through said gas-dispersing apertures and mixes with air entering said base member through said side passageways to form a combustible mixture.

34. The device of claim 33, further comprising means for fastening said cover member to said base member.

35. The device of claim 34, wherein said fastening means comprises a hole in said cover member and a second hole in said base member, each of said holes being coaxially alignable for receiving the conventional air cleaner cover fastener rod of an automobile carburetor.

* * * * *

REEXAMINATION CERTIFICATE (543rd)
United States Patent [19]
Greenway et al.

[11] B1 4,479,466
[45] Certificate Issued    Jul. 29, 1986

[54] NATURAL GAS AND AIR MIXING DEVICE

[76] Inventors: Donald O. Greenway; Frank J. Davis, both of 6275 Georgia Hwy. 85, Riverdale, Ga. 30274

Reexamination Request:
No. 90/000,814, Jul. 5, 1985

Reexamination Certificate for:
Patent No.: 4,479,466
Issued: Oct. 30, 1984
Appl. No.: 554,362
Filed: Nov. 22, 1983

[51] Int. Cl.[4] .......................................... F02M 21/04
[52] U.S. Cl. ................................. 123/527; 123/525; 48/180.1; 48/189.2; 261/41 R
[58] Field of Search ................ 123/525–527, 123/27 GE; 48/180.1, 189.2; 261/41 R, 69 R

[56] References Cited

U.S. PATENT DOCUMENTS

| | | | |
|---|---|---|---|
| 2,983,592 | 5/1961 | Jones | 123/527 |
| 3,081,160 | 3/1963 | Ensign | 123/527 |
| 4,398,521 | 8/1983 | Schuurman | 123/527 |
| 4,425,140 | 1/1984 | Lassanske et al. | 123/527 |
| 4,497,304 | 2/1985 | Wintrell et al. | |

FOREIGN PATENT DOCUMENTS

| | | |
|---|---|---|
| 1142822 | 3/1983 | Canada . |
| 1299932 | 9/1969 | Fed. Rep. of Germany . |
| 82/02926 | 9/1982 | PCT Int'l Appl. ............ 123/527 |
| 1469464 | 4/1977 | United Kingdom . |

OTHER PUBLICATIONS

Advertising Brochure–Propane Plus–Sep., 1980 Dual Fuels Associates Corp., Orem, Utah.
Installation Instructions for Propane Fuel Conversion Kit–Dec., 1980, Dual Fuels Associates Corp., Orem, Utah.
The Propane Plus–Advertising Brochure–Jul., 1981, Dual Fuels Associates Corp., Orem, Utah.
The Propane Plus–Revised Advertising Brochure–Jul., 1981, Dual Fuels Associates Corp., Orem, Utah.
Propane–A Clean, Environment with America's Economical Motor Fuel–May 21, 1982, Dual Fuels Associates Corp., Orem, Utah.
Utah Energy News, vol. 11, No. 2, Article entitled "Propane Conversions Undergo Private Fleet Tests".
Fleet Maintenance & Specifying, Feb. 1984, p. 62, Article No. 162, Air/Fuel Mixer.
C&G Fuel Systems, Ltd., 1310 Fewster Dr., Mississauga, Ontario, Canada L4W1A4, Model 19-000-410.
IMPCO Carburetion Inc., 16916 Gridley Place, Cerritos, CA 90701, Model CA50-600.
Vialle USA Inc., 7042 Lampson Ave., Garden Grove, CA 92641.
Garrison, Inc., 641 West Industrial Park, Mt. Pleasant, Iowa 52641, Model Vaculift.
Advanced Fuel Systems, Inc., 118 North Indiana, Wichita, Kansas 67214, Model Flowtube.
Dual Fuels Associates Corporation, Orem, Utah, DFA Conversion Kit for 350 Chev. (Model unknown).

*Primary Examiner*—Ethel R. Cross

[57] ABSTRACT

A natural gas and air mixing device for allowing the combustion of a mixture of natural gas and air in a conventional internal combustion engine. The device includes a gas plenum which disperses natural gas through apertures into a mixing chamber, where the gas mixes with air drawn through passageways in an annular rim which is fitted over the air intake of a conventional carburetor. The construction of the device allows alternate operation of the engine with gasoline as the fuel and requires few alterations in the engine compartment.

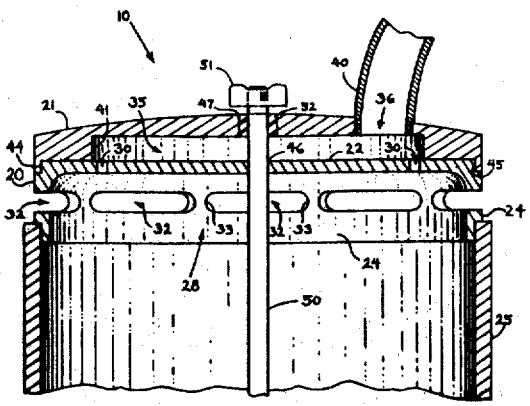

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 8 is cancelled.

Claims 1, 17, 20 and 33 are determined to be patentable as amended.

Claims 2-7, 9-16, 18, 19, 21-32, 34 and 35, dependent on an amended claim, are determined to be patentable.

New claims 36-51 are added and determined to be patentable.

1. A natural gas and air mixing device for allowing the introduction of a combustible mixture of natural gas and air into a conventional internal combustion engine carburetor, comprising:
generally cylindrical rim means for positioning over substantially the entire air intake of a conventional internal combustion engine carburetor and defining [an] a cylindrical interior volume [of] for mixing the gas and air over said air intake,
said rim means including a plurality of air passageways for introducing air from a conventional air cleaner into said interior volume through said rim means;
an upper plate member rigidly secured to said rim means across the top of said cylindrical interior volume and including a plurality of downwardly opening gas-dispersing apertures positioned over said interior volume; and
hollow gas plenum means positioned on said plate member above said gas-dispersing apertures for receiving a supply of natural gas and for dispensing same to said gas-dispersing apertures,
whereby natural gas introduced into said plenum is dispersed downwardly into said interior volume through said gas-dispersing apertures and mixes with air entering said cylindrical interior volume through said air passageways to form a combustible mixture.

17. The device claim [13] 14, wherein the lowermost extent of said downwardly facing air flow surface is spaced apart from and radially inwardly of said lower edge of at least one of said air passageways.

20. A natural gas and air mixing device for allowing the introduction of a combustible mixture of natural gas and air into a conventional internal combustion engine carburetor, comprising:
a lower base member comprising an upper plate member and a downwardly disposed rim,
said upper plate member including a plurality of downwardly-opening gas-dispersing apertures disposed on said plate member,
said plate member and said rim defining [an] a cylindrical interior volume for said base member for disposition over the air intake of a conventional internal combustion engine carburetor,
said rim including a plurality of elongate side air passageways for introducing air from outside said rim into said interior volume of said base member through said rim; and
an upper cover member comprising a gas plenum positioned over said gas-dispersing apertures, and port means for introducing natural gas into said plenum,
whereby natural gas introduced into said plenum is dispersed downwardly into the interior volume of the base member through the gas-dispersing apertures, where it mixes with air entering the interior volume through the side air passageways to form a mixture combustible in a conventional gasoline engine.

33. A natural gas and air mixing device for allowing the introduction of a combustible mixture of natural gas and air into a conventional internal combustion engine carburetor, comprising:
a circular lower base member comprising a substantially flat upper plate member and a downwardly disposed annular rim for positioning over substantially the entire air intake of a conventional internal combustion engine carburetor,
said plate member including a plurality of circular downwardly opening gas-dispersing apertures disposed in a ring-like configuration and at equal predetermined radii from the axis of said base member;
said rim including a plurality of elongate air-introducing side passageways having a length and a width, the width of said passageways extending in substantially the same direction as the axis of said base member, and each of said passageways including arcuate end portions; and
an upper cover member comprising a downwardly disposed annular mating ring for mating said cover member with said plate member of said base member, an annular plenum having an axis aligned with the axis of said base member and having a radius larger than the radius at which said apertures in said plate member are disposed, and port means for introducing natural gas from a supply into said plenum;
whereby natural gas introduced into said plenum is dispersed downwardly into said base member through said gas-dispersing apertures and mixes with air entering said base member through said side passageways to form a combustible mixture.

36. The device of claim 1, further comprising means for lowering the pressure at said gas-dispersing apertures relative to the pressure at said air passageways to draw gas from said plenum into said interior volume.

37. A natural gas and air mixing device for allowing the introduction of a combustible mixture of natural gas and air into a conventional internal combustion engine carburetor, comprising:
rim means for positioning over substantially the entire air intake of a conventional internal combustion engine carburetor and defining an interior volume for mixing gas and air,
said rim means including a plurality of air passageways for introducing air from a conventional air cleaner into said interior volume;

an upper plate member rigidly secured to said rim means and including a plurality of gas-dispersing apertures positioned over said interior volume;

means for directing air flow entering through said air passageways past said gas-dispersing apertures to enhance the Venturi effect for drawing gas into said interior volume; and hollow gas plenum means positioned on said plate member above said gas-dispersing apertures for receiving a supply of natural gas, whereby natural gas introduced into said plenum is dispersed downwardly into said interior volume through said gas-dispersing apertures and mixes with air entering said interior volume through said air passageways to form a combustible mixture.

38. The device of claim 37, wherein said air flow directing means comprises means defining a downwardly facing air flow surface spaced radially inwardly from said rim means for directing air entering through said air passageways inwardly and downwardly, and wherein said gas-dispersing apertures are positioned to open on said downwardly facing air flow surface.

39. The device of claim 38, wherein said air passageways include an upper edge and a lower edge, and wherein said downwardly facing air flow surface is coextensive with said upper edge of at least one of said air passageways.

40. The device of claim 39, wherein the lowermost extent of said downwardly facing air flow surface is spaced apart from and radially inwardly of said lower edge of at least one of said air passageways.

41. The device of claim 38, wherein said upper plate member further includes a downwardly facing concave lower surface, and an annular lip spaced radially inwardly from said rim means and forming an intersection between said downwardly facing air flow surface and said downwardly facing concave lower surface.

42. The device of claim 37, wherein said air flow directing means comprises downwardly depending second rim means having a radius less than said rim means and rigidly secured to the lower surface of said upper plate member.

43. The device of claim 37, wherein said air flow directing means creates a laminar flow region adjacent said gas-dispersing apertures.

44. The device of claim 37, wherein the pressure at said gas-dispersing apertures is lower than the pressure at said air passageways.

45. A natural gas and air mixing device for allowing the introduction of a combustible mixture of natural gas and air into a conventional internal combustion engine carburetor, comprising:

rim means for positioning over substantially the entire air intake of a conventional internal combustion engine carburetor and defining an interior volume for mixing gas and air, said rim means including a plurality of air passageways for introducing air from a conventional air cleaner into said interior volume;

an upper plate member rigidly secured to said rim means and including a plurality of gas-dispersing apertures positioned over said interior volume;

hollow gas plenum means positioned on said plate member above said gas-dispersing apertures for receiving a supply of natural gas; and means for lowering the pressure at said gas-dispersing apertures relative to the pressure at said air passageways to draw gas from said plenum into said interior volume, whereby natural gas introduced into said plenum is dispersed downwardly into said interior volume through said gas-dispersing apertures and mixes with air entering said interior volume through said air passageways to form a combustible mixture.

46. The device of claim 45, wherein said pressure lowering means comprises means for directing air flow entering through said air passageways past said gas-dispersing apertures to enhance the Venturi effect for drawing gas into said interior volume.

47. The device of claim 46, wherein said air flow directing means comprises means defining a downwardly facing air flow surface spaced radially inwardly from said rim means for directing air entering through said air passageways inwardly and downwardly, and wherein said gas dispersing apertures are positioned to open on said downwardly facing air flow surface.

48. The device of claim 47, wherein said air passageways include an upper edge and a lower edge, and wherein said downwardly facing air flow surface is coextensive with said upper edge of at least one of said air passageways.

49. The device of claim 48, wherein the lowermost extent of said downwardly facing air flow surface is spaced apart from and radially inwardly of said lower edge of at least one of said air passageways.

50. The device of claim 47, wherein said upper plate member further includes a downwardly facing concave lower surface, and an annular lip spaced radially inwardly from said rim means and forming an intersection between said downwardly facing air flow surface and said downwardly facing concave lower surface.

51. The device of claim 46, wherein said air flow directing means comprises downwardly depending second rim means having a radius less than said rim means and rigidly secured to the lower surface of said upper plate member.

* * * * *